(12) United States Patent
Eikkula

(10) Patent No.: US 7,096,023 B1
(45) Date of Patent: Aug. 22, 2006

(54) NUMBER PORTABILITY SERVICE IN A TELECOMMUNICATION SYSTEM

(75) Inventor: Jari Eikkula, Helsinki (FI)

(73) Assignee: Nokia Corporation, Espoo (FI)

( * ) Notice: Subject to any disclaimer, the term of this patent is extended or adjusted under 35 U.S.C. 154(b) by 441 days.

(21) Appl. No.: 10/019,713

(22) PCT Filed: Jun. 28, 2000

(86) PCT No.: PCT/EP00/05993

§ 371 (c)(1),
(2), (4) Date: May 29, 2002

(87) PCT Pub. No.: WO01/03446

PCT Pub. Date: Jan. 11, 2001

(30) Foreign Application Priority Data

Jul. 1, 1999 (GB) ............................ 9915427.0

(51) Int. Cl.
*H04Q 7/22* (2006.01)
*H04Q 7/24* (2006.01)

(52) U.S. Cl. ............... 455/445; 445/406; 445/414.1; 445/433; 379/221.01; 379/221.09; 379/221.13

(58) Field of Classification Search ............ 455/433, 455/445
See application file for complete search history.

(56) References Cited

U.S. PATENT DOCUMENTS

| | | | | |
|---|---|---|---|---|
| 5,839,072 | A * | 11/1998 | Chien | 455/445 |
| 6,028,914 | A * | 2/2000 | Lin et al. | 379/14 |
| 6,049,714 | A * | 4/2000 | Patel | 455/433 |
| 6,226,517 | B1 * | 5/2001 | Britt et al. | 455/445 |
| 6,243,374 | B1 * | 6/2001 | White et al. | 370/352 |
| 6,356,756 | B1 * | 3/2002 | Koster | 455/445 |
| 6,411,703 | B1 * | 6/2002 | Martinez et al. | 379/221.01 |
| 6,438,223 | B1 * | 8/2002 | Eskafi et al. | 379/221.13 |
| 2004/0053610 | A1 * | 3/2004 | Kim | 455/432.1 |
| 2005/0186950 | A1 * | 8/2005 | Jiang | 455/417 |
| 2005/0197105 | A1 * | 9/2005 | McCann | 455/412.1 |

FOREIGN PATENT DOCUMENTS

| | | |
|---|---|---|
| JP | 09-036965 | 2/1997 |
| JP | 09-331390 | 12/1997 |
| WO | WO 97/27717 | 7/1997 |
| WO | 9923839 | 5/1999 |

OTHER PUBLICATIONS

"Routing Service for the Provision of Number Portability" by W. Lautenschlager et al, Iss. World Telecommunications Congress (International Switching Symposium), CA, Toronto, Pinnacle Group, pp. 235-242 XP-000704473 (Publication Date Sep. 21, 1997).

Patent Abstracts of Japan, publication No. 09-331390, "Call Control Method for Intelligent Network", Hiroshi et al.

(Continued)

*Primary Examiner*—Fan Tsang
*Assistant Examiner*—Lisa Hashem (57) ABSTRACT

The present invention relates to a method and a network element in a telecommunications system. The telecommunications system comprises at least two telecommunications networks and means for providing number portability service between the networks and also supplementary telecommunications services. The method comprises the steps of initiating a set-up procedure for communications between two stations, sending an enquiry to the number portability service, determining if the called station is a ported station, and informing the supplementary telecommunications service of the results of said determination before initiating an use of said supplementary telecommunications service.

21 Claims, 2 Drawing Sheets

OTHER PUBLICATIONS

Patent Abstracts of Japan, publication No. 09-036965, "System and Method for Processing Call to Network Subscriber with Telephone Number Changed", R. R. Michael.

"Understanding and Deploying Local Number Portability" R.M. Wienski 1998 Annual Review of Communications, XP000793160, pp. 502-512.

"Camel: The Impact of Personal Communications on Intelligent Networks" R. Becher et al, Iss. World Telecommunications Congress (International Switching Symposium), CA, Toronto, Pinnacle Group pp. 225-233, XP-000704472 (Publication Date Sep. 21, 1997).

* cited by examiner

NUMBER PORTABILITY SERVICE IN A TELECOMMUNICATION SYSTEM

FIELD OF THE INVENTION

The present invention relates to a telecommunication system and in particular, but not exclusively, to a telecommunication system including mobile telecommunications and providing supplementary telecommunications services for the users thereof.

BACKGROUND TO THE INVENTION

Users of fixed line terminals or mobile stations (such as a mobile telephone or a transceiver unit provided with data processing capabilities or a transceiver unit provided with capability of using TCP/IP protocol (Transport Control Protocol/Internet Protocol) suite or similar user equipment) may want to switch from one operator providing an original subscription to another operator without having to change the number or address of the subscription. This kind of possibility would strengthen the user's position with respect to the operators and facilitate the user making use of the most generous offers by different operators and/or to use operators which give the best value for money and/or best service at any moment.

Mobile users have the possibility to utilise the so called mobile number portability (MNP) feature for the above. A more detailed description of one possibility for the MNP can be found e.g. from the ETSI MNP (European Telecommunications Standards Institute—Mobile Number Portability) specification. In general, the MNP allows the number of a mobile subscriber to remain unchanged when the network or the operator is changed i.e. ported from one operator to another. This means that within the MNP the mobile subscriber is able to change the subscription network within the same country while retaining his or her original MSISDN (Mobile Subscriber ISDN number) or several MSISDNs. In principle it is also possible to change from an operator in one country to an operator in another country, but there may be some international/national legislation and regulations which may prevent porting between different countries.

A mobile user (or subscriber) having used the MNP assignment is sometimes referred to as an exported or ported mobile user. Calls to the ported mobile user are, depending in most cases on national requirements, first routed to the original network of the user on the basis of the unchanged mobile number (i.e. on the basis of the MSISDN of the user). Then a specific routing register located in the old network recognises that the number is an exported number, and subsequently redirects the call related signalling to the new recipient network. The call is then routed to the called mobile subscriber by means of the routing arrangement of the new network. The MNP implementations can also route short messages (e.g. GSM SMS messages) and other non-call related signalling.

As mentioned above, special routing registers or databases have been implemented into the telecommunications networks in order to enable the operation of the number portability service, the registers containing necessary rerouting information of the ported mobile subscribers. In one network, all affected non-call related signalling messages and routing enquiry messages originated in the respective network or outside the network can be routed through the routing register (or several registers). The routing register may provide e.g. the following functions:

Relay of E.164 addressed SCCP (Signalling Connection Control Part) messages directed to the network's own subscriber to the correct HLR (Home Location Register: a register in the subscribed network containing information associated to the subscriber); and Relay of routing enquiry messages addressed to, for example, a ported subscriber and served by another network to the MAP (Mobile Application Part) level NP (Number Portability) application. The NP application returns the routing number in MAP SRI (Send Routing Information) response message. The routing number then enables routing of the call to the recipient network for call handling.

A MAP based NP database query can be used for the required call related functionality. The specific routing register is used for identifying the ported status of the addressed MSISDN in conjunction with a MAP level application to provide necessary re-routing information in a MAP SRI response message.

Thus the routing register functionality has a key role in a telecommunications system providing mobile number portability. The main functionality of the routing register is to provide operators with rerouting capability and an application level functionality for returning the required routing information. The routing register handles both non-call and call related signalling messages. By means of the routing register the subscriber is able to keep the existing mobile telephone number when porting from one operator to the new one. The rerouting functionality is achieved with the free association of the "phone number routing information" (the subscriber phone number can be, for instance, the MSISDN). The routing information can be a real directory number for a service number, an address of a network element or, for instance, a mobile number portability routing number inquired from an internal database of the routing register.

In principle the ported subscriber should be able to use exactly the same services as a non-ported subscriber in the same subscription network. In other words, in order to receive the maximum benefit of the number portability service there should be no difference in whether the subscriber's MSISDN belongs to the used network or whether the subscriber's MSISDN is ported to the used network—the services offered to the user by that subscription network and the service level should nevertheless be the same.

These services offered to the users include supplementary telecommunication services or functionalities. The supplementary services are also sometimes referred to as intelligent network (IN) services or advanced telecommunications services. The supplementary or intelligent network service can be defined as a telecommunication feature providing various sophisticated services or value-added services to the subscribers, for instance by means of software and/or hardware implementations provided in one or several nodes of the telecommunications system. The user can access the supplementary telecommunications services by means of his terminal, either fixed or mobile. The supplementary network service comprises an ever increasing amount of services such as prepaid calls, differently priced calls to different numbers or number spaces, call blocking ("do not disturb") or barring of calls from certain numbers or number spaces, call forwarding, callback (completion of call to a busy/unreachable subscriber), remote control of services, calls for various toll free numbers ("freephone") or specially priced numbers, answering/voice mail, conference calls or group calls, announcements to the users, such as calling number information or remaining calling time, subscription or extension groups (e.g. a virtual private network, VPN), user location services, and so on.

The present implementations of the intelligent network (IN) can comprise a service switching (or detection and triggering) point (SSP) and a service control point (SCP). These two points can also be in the form of an integrated unit or node (SSCP: service switching and control point). The detection and triggering arrangement can, for example, be such that the user dials a predefined telephone number including a predefined prefix indicating an IN call or then the entire number is used as IN call indicator. The switching point recognises the IN prefix or number and subsequently suspends the call handling and request further instruction from the control point. After having received the instructions from the control point the switching point will proceed accordingly. Subsequent to the triggering the control point controls the connection to the intelligent network and the various available functions thereof, depending on the intelligent network service in question. However, it is noted there are also various other possibilities than the above described for the detection and triggering (such as different timer arrangements).

The hitherto suggested MNP implementations are such that the user is allowed to retain his original MSISDN. Contrary to that, the IMSI (International Mobile Subscriber Identity) of the user must not be ported in the current applications, but the recipient network of the porting progress has to issue a new IMSI for the ported mobile subscription.

In operation, mobile telecommunication networks make several assumptions which are based on the MSISDN. Several procedures of mobile telecommunications networks, such as sorting and screening functions, are directly based on these assumptions. These assumptions essentially affect all the procedures that make use of the MSISDN number ranges or number spaces. The problem when using the number portability service is that many of these assumptions based on the MSISDN are no longer valid. For example, the MSISDN no longer indicates the actual subscription network (it gives only an indication of the original network), which has an effect on all such services which need the information of the actual network subscribed by the called party. In addition, the number ranges or spaces of the MSISDN can no longer be used in all mobile network functions (National Destination Code, for example).

One of the problems is caused by the fact that in case the call is made to a ported number, the intelligent network control point and thus the services behind the intelligent network control point will not become aware of the actual called number (B-number), i.e. the number in the actual network of the called subscriber. In addition, instances and applications where the mobile number portability services and the intelligent network services are used simultaneously have proven to be problematic. The use of ported numbers has also disadvantageous affects e.g. in relation with so called "home zone" type services or similar services where it is essential to know where the called subscriber is located at the time of the call and/or to which network/number range the called subscriber belongs (this affects e.g. the charging or the routing of the call or the service level provided for the call). This information could be obtained from a home location register of the subscribed networks, but if the called subscriber is a ported subscriber the supplementary telecommunications service is not aware of the address of the home location register for him. The use of the current type of routing registers also causes signalling load in the used networks and also within the intelligent network service. The routing of the calls to ported numbers is not always accomplished in an optimised manner as the calls are routed through the apparatus of the original (old) operator even in situations where neither the calling party or the called party is subscribing or using the original network.

These hitherto unsolved issues may have various kinds of effects in view of the controllability and management of the calls, e.g. in view of call charging, called user location data and back-signalling. Some of these effects may even be such that they may cause malfunction situations and/or excessive amount of signalling load in the network.

SUMMARY OF THE INVENTION

The embodiments of the present invention aim to address one or more of the above problems.

According to one aspect of the present invention, there is provided a method in a telecommunications system, the telecommunications system comprising at least a first telecommunications network and a second telecommunications network and providing at least one supplementary telecommunications service, the method comprising the steps of:

initiating a set-up procedure for communications between a first station and a second station via said telecommunications system;

sending an enquiry to a number portability service, said number portability service facilitating porting of stations from the first telecommunications network to the second telecommunications network so that the number or address of the ported stations may remain the same;

determining if the second station is a ported station; and informing at least one supplementary telecommunications service of the results of said determination before initiating an use of said at least one supplementary telecommunications service.

According to another aspect of the present invention there is provided a network element for use in a telecommunications system, said telecommunications system comprising at least a first telecommunications network and a second telecommunications network and providing at least one supplementary telecommunications service for stations communicating with the system, comprising:

means for set-up proceedings of a call between two stations;

means for controlling said at least one supplementary telecommunications service;

means for providing a number portability service for the stations, said number portability service facilitating porting of a station from the first telecommunications network to the second telecommunications network so that the number or address of the ported station may remain the same;

wherein the network element is arranged to determine if the called station is a ported station and to inform said at least one supplementary telecommunications service of the result of the determination before use of said at least one supplementary telecommunications service is initiated for the call.

According to a still further aspect of the present invention there is provided a telecommunications system enabling at least two stations connected to the system to communicate comprising:

a first telecommunications network;
a second telecommunications network;
supplementary telecommunications service means for providing at least one supplementary telecommunications service for stations communicating with the system;

control means for controlling said at least one supplementary telecommunications service;

call set-up means for set-up proceedings of a call between the two stations;

means for providing a number portability service for the stations, said number portability service facilitating porting of a station from the first telecommunications network to the second telecommunications network so that the number or address of the ported station may remain the same;

wherein the network element is arranged to determine if the called station is a ported station and to inform said at least one supplementary telecommunications service of the result of the determination before use of said at least one supplementary telecommunications service is initiated for the call.

According to more specific embodiments, the determination of the status of the number portability service for the second station and the informing of the supplementary telecommunications service of said status can be accomplished at a node controlling both the number portability service and the supplementary telecommunications service. The supplementary telecommunications service can also be informed of the results of the determination only if the second station is determined to be a ported station. The number portability service can be one of the supplementary telecommunications services provided by the telecommunications system The telecommunications system may comprise at least one mobile telecommunications network including a controller and a home location register for storing user related data associated to individual subscribers of the mobile telecommunications network, and the number portability service may comprise a routing information register between the network controller and the home location register. According to one embodiment the enquiry is sent as a routing information enquiry from the network controller to the home location register during the set-up of the connection, the routing information enquiry is directed to pass through the routing information register, the determination of the status of the number portability service of the second station is accomplished at the routing information register the, and, if the second station is determined to be a ported number, the status information is returned to the controller without allowing the routing information enquiry to enter the home location register. The status of the number portability service can be verified in the beginning of an originating status model of an supplementary telecommunications application protocol suite. The verifying of said status may comprise a step of sending a service routing register inquiry at an initial detection point of an INAP protocol.

The embodiments of the invention provide several advantages. The embodiments make it possible to ensure that the called party information, such as location and the subscribed network, is correct when an supplementary telecommunications service is initiated. This has an advantageous affect in view of call handling and management, e.g. in view of call charging and call related signalling and call routing. The embodiments are also useful in optimising the use of call transmitting capacity (e.g. the capacity of trunks and gateways). The embodiments of the invention will also help in enabling a more efficient use of the routing register functionality in the future applications. It is believed the role of the routing register functionality will increase as there will be even more new enhanced IN services that place more demands on the operation of the networks elements and as there will be much more subscribers in the mobile telecommunication networks.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
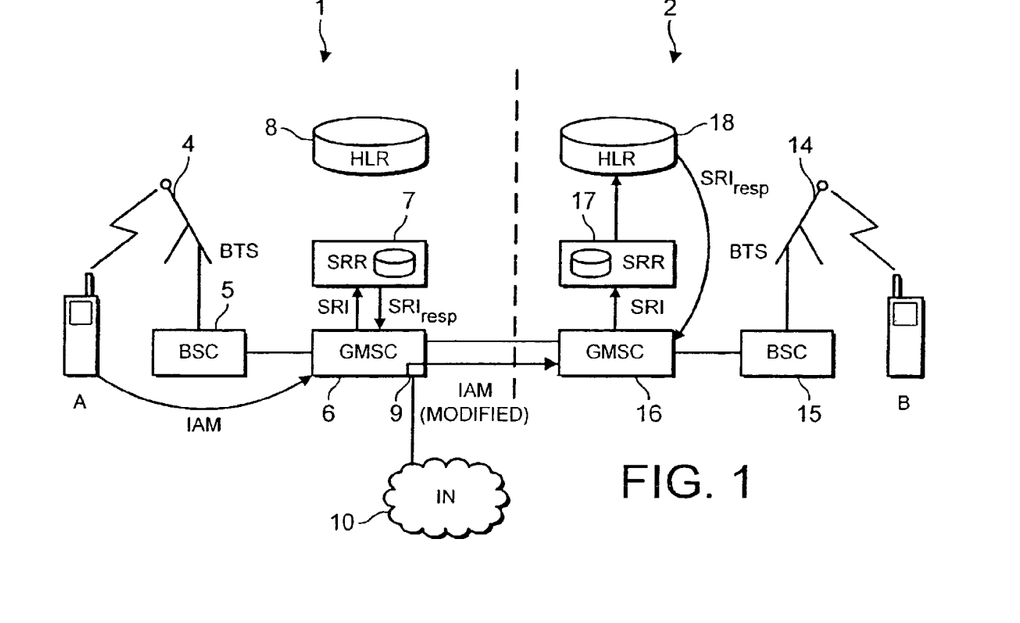
FIG. 1 shows the general arrangement of a telecommunications system providing number portability.

Reference is made to FIG. 1 which shows one implementation of a number portability service in a public land line mobile network (PLMN) environment. More particularly, the example shows two GSM Global System for Mobile communications) networks 1 and 2. However, even though the following description of the exemplifying cellular telecommunications networks uses the terminology of a GSM PLMN, it should be appreciated that the proposed solution can be used in any telecommunications system providing communications between a calling station and a called station, supplementary telecommunications services, and a number portability service.

In FIG. 1 the calling mobile station A (the A-number) is served by a base transceiver station (BTS) 4 of the PLMN 1. The called mobile station B (the B-number) is correspondingly served by a base transceiver station 14 of the PLMN 2. The arrangement is such that each base transceiver station of the system is arranged to transmit signals to and receive signals from the respective mobile station (MS) within the coverage area of the BTS. Likewise, the mobile stations are able to transmit signals to and receive signals from the respective base transceiver station and the mobile stations are capable of accomplishing this via wireless communication with the respective base stations. It is noted that typically a number of mobile stations will be in communication with each base station although only one mobile station is shown in FIG. 1 for clarity. Each of the base stations can be connected via a Base Station Controller (BSC) 5 or 15 to a respective serving network controller, which in the exemplifying illustration are Gateway Mobile Switching Centers (GMSC) 6 and 16. It is noted that more than one base station can be connected to each of the controllers. Typically more than one controller is also provided in a network, the arrangement being usually such that instead of a GMSC the base transceiver stations are served by a Mobile Switching Center (MSC). Several MSCs or similar controllers are then connected to a Gateway Mobile Switching Center (GMSC) or e.g. a serving GPRS Support Node (SGSN) in a GPRS service. However, as the detailed network architecture is not important in understanding the invention, it is not described in more detail herein.

The illustrated PLMN networks 1 and 2 include also home location registers (HLR) 8 and 18, respectively. The general operation of the PLMN requires that each subscriber of the PLMN has to be permanently registered in one register or database of the network, such as the HLR. More particularly, each home location register or similar database is used for permanently storing user related data of those subscribers who are subscribing to the associated network. The subscriber related data includes, in addition to the MSISDN and IMSI, information such as the present location of the mobile station, subscribed services and/or service level, charging information, service restrictions and any other similar subscriber related information considered as relevant for a specific implementation. An HLR can be a stand-alone network element or built into some of the network controllers, such into an MSC or an GMSC.

GMSC 6 comprises further a switching point 9 for supplementary telecommunications services i.e. intelligent network (IN) services 10. As explained above, the IN services include various advanced supplementary telecommunication services which the subscribers can utilise through their subscriptions.

FIG. 1 illustrates further Service Routing Registers (SRR) 7 and 17 for networks 1 and 2, respectively. A routing register contains required routing information of a ported mobile subscriber e.g. in a table containing those subscribers who have been ported from the network to another network. In order to verify whether the initiated call is directed to a ported subscriber, all non-call related signalling messages and routing enquiry messages originated in a certain network or outside the certain network but directed to said network can be routed through the routing register of the network. The arrangement is preferably such that even though the messages are directed to the HLR of that network, they will pass through the routing register located in the communication path between the networks controller and the HLR. It is, naturally, possible to have an arrangement in which all calls are not processed in this manner, e.g. such that the signalling of calls to certain number spaces is not directed to the routing register, but will go directly to the HLR. However, this may cause some problems in routing and/or more complicated software and hardware implementations.

It is noted that even though this is not illustrated by FIG. 1, the number portability service can be implemented by means of the IN services. In other words, the number portability and associated records thereof can be one of the various services provided by the IN 10 or similar functionality providing supplementary telecommunications services.

In FIG. 1 the user of the B station (the B-number) has originally subscribed to network 1, but is now ported to the network 2, and is thus registered in the HLR 18 thereof. It is noted here that the B-number could also be ported from a fixed line network (not shown) to the network 2. The calling station A (the A-number) in turn can be a subscriber of any network, i.e. network 1 or 2 or any other network, such as any fixed line network. When initiating the call (see also step 30 in FIG. 3), station A sends an IAM (Initial Address Message) or any appropriate call set-up message to the GMSC 6. After analysing the called B-number the GMSC 6 generates and sends an SRI (Send Routing Information) to the HLR 8 through the routing register SRR 7 (step 32 in FIG. 3). In case the number portability service is implemented by means of the IN 10, the routing information enquiry can be, for example, included in an IDP (Initial Detection Point: a procedure initiating the use of an IN service). In case of a ported subscriber the routing register would then respond with a connect message (for instance, with a CON in the INAP) identifying the routing number.

Figure 3:
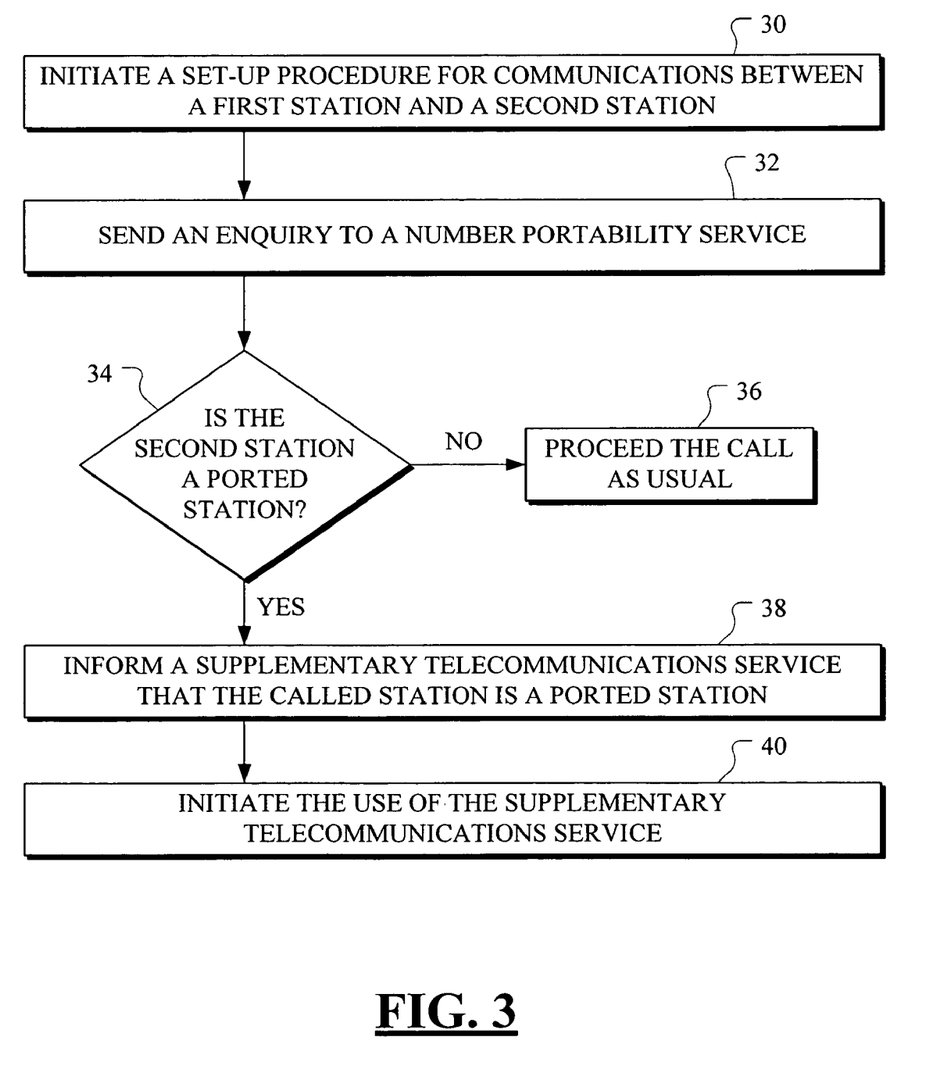
FIG. 3 is a flowchart illustrating the operation of one embodiment of the present invention.

The SRR 7 is arranged to verify whether the call is directed to a ported B-number or to an actual subscriber of network 1 (step 34 in FIG. 3). This can be accomplished e.g. by means of a routing register database including routing information to the new network for the ported subscribers and to the HLR for the non-ported subscribers. More particularly, the arrangement can be such that the numbers can be stored in the database of the routing register, wherein incoming routing information requests are verified against this database. According to one alternative the ported numbers are mapped in a table included in the routing register, wherein all incoming routing information requests are verified against this table. However, there are also other alternatives for implementing this determination of the status of the B-number.

In case the number is determined to be a non-ported number, the signalling is let through to the HLR 8, and the call proceedings will continue in a normal manner (step 36 in FIG. 3). However, FIG. 1 illustrates the condition when the SRR 7 recognises that the call is intended for the B-subscriber ported to the network 2 (and thus registered in the HLR 18 of network 2), and therefore, instead of passing the routing information to the HLR 8 of the original network 1, the SRR 7 returns a responding message (SRIresp) to the GMSC 6 indicating that the called number is a ported number and/or providing the controller 6 with routing information to the actual network 2 of the ported number (step 38 in FIG. 3). A MAP-level number portability application can be used for returning a MAP SRI response message to the GMSC containing a prefixed called party number as a roaming number, wherein the prefix would then identify the correct subscription network. Thereafter the GMSC can route the call signalling to the subscription network 2 on the basis of the prefix. The message from the GMSC 6 to the GMSC 16 can be, for instance, in the form of "modified" IAM. The GMSC 16 of the subscription network 2 receives the message, removes the prefix, and generates a new routing information enquiry on the basis of analysis made to the called party number received in the modified IAM, and sends this to the HLR 18 through routing register SRR 17. The register 17 determines the called party B-number as a subscribing number, and thus allows the routing information enquiry to pass to the HLR 18 without any further processing. The HLR 18 then returns the roaming number to the GMSC 16 e.g. in a MAP SRI response message, whereafter the GMSC 16 can route the call to the station which is associated to the called B-number.

In addition to providing the rerouting information to the controller 6 of the network 1, the routing register 7 provides also the intelligent network service 10 with such information that the intelligent network service, and more precisely, the control point thereof becomes aware that the called party is a ported subscriber (step 38 in FIG. 3). By means of this kind of arrangement it is possible to provide any intelligent network service with the porting status information during the call set-up and before an actual use of said intelligent network service is initiated (step 40 in FIG. 3).

Figure 2:
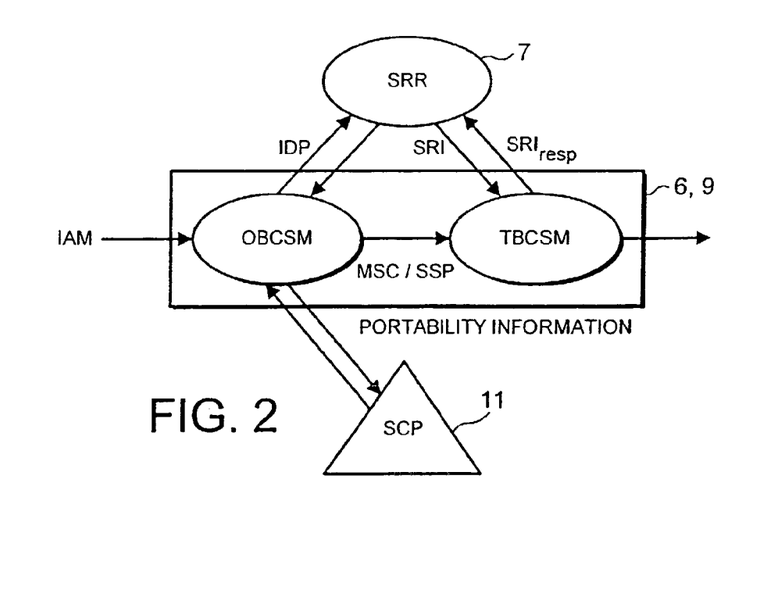
FIG. 2 shows the signalling in accordance with one embodiment of the present invention.

FIG. 2 is a schematic illustration in accordance with an embodiment of the present invention showing an IN based number portability service implemented within an intelligent network node. The node includes MSC/SSP functionality 6, 9, a routing register 7 of an number portability service and a service control point SCP 11 for controlling the use of all such supplementary telecommunications services provided by the node. More particularly, FIG. 2 shows how the signalling within the IN node is arranged during call set-up relative to the different call state models of the Intelligent Network Application Part (INAP) protocol suite, as will be discussed in more detail later on.

As mentioned above, the routing register SRR 7 can be an IN based supplementary service implemented within the same node with the other IN services provided for the A-subscriber (the calling subscriber in this example). The service control point SCP 11 of the IN service is arranged to control the A-subscriber, and more particularly, all communication of the A-subscriber that includes use of the supplementary telecommunications services. The control point 11 contains necessary data and logic for the supplementary telecommunications i.e. IN services. The control point 11 receives a request from the service switching point (not shown in FIG. 2), executes the requested services and returns the necessary information to the switching point. The control point 11 thus handles various functions, such as charging and management of the used services. The control point functions may sometimes be referred to as service control functions (SCF). As already noted, the service switching point and control point can be implemented within one node (e.g. within one telephone exchange or radio network controller or switching centre) which node then functions for both detection of IN connections and execution of the service logic.

During the call set-up the control point SCP controlling the calling A-subscriber may have a signalling connection for receiving and/or sending information during an Originating Basic Call State Model (OBCSM) of the Intelligent Network Application Part (INAP) protocol suite. The OBCSM can be defined as a first (originating) phase of the call set-up. FIG. 2 illustrates further a Terminating Basic Call State Model (TBCSM) of the INAP protocol suite, which is a later phase of the call processing model, i.e. a phase in which the call set-up is completed. The SCP may have a signalling connection also with the TBCSM. However, due to the general architecture of the current IN applications, the SCP 11 cannot handle the signalling with the OBCSM and the TBCSM at a same logic, but these are always handled in separate service logics or by separate independent objects without any interaction between them.

It has been found that the routing information enquiry can be accomplished at the Originating Basic Call State Model (OBCSM) by sending an IDP to the SRR already at this stage instead of performing the enquiry at the TBCSM. If the called B-number is determined by the SRR 7 to be a ported B-number, then the SCP 11 can be informed of the status of the B-subscriber at the OBCSM before any other IN services are initiated. In the prior art proposals the routing information enquiry from the routing information register 7 was accomplished only at the TBCSM, whereby the SCP 11 could not receive the information concerning the porting status of the B-number, and thus the IN services had to be initiated by the SCP 11 without any information of the porting status of the B-number, which lead into those problems discussed above.

The other IN services which are initiated only after the routing information enquiry will now receive the NP status information already at the Initial Detection Point (IDP) at the time of triggering the call into the IN services. In other words, the status of the NP services is verified already at the beginning of originating basic call state model before any other IN service is started. This enables a proper control of the interaction between the number portability service and the other IN services.

It is to be noted that even though the above describes the use of an INAP protocol suite, the invention can be similarly implemented in connection with other supplementary telecommunication service protocols, such as CAP (Customised Applications for Mobile network Enhanced Logic (CAMEL) Application Protocol), wherein the SCP functionality is implemented by means of a CSE (CAMEL Service Environment).

It should also be appreciated that whilst embodiments of the present invention have been described in relation to mobile stations and mobile telecommunications networks, embodiments of the present invention are applicable to any other suitable type of user equipment and networks. For example, the network controller requesting the routing information from the routing register can be an exchange or node of a fixed line telecommunications system, and the supplementary service to which the information is to be provided is a supplementary service provided to the subscriber of the fixed line telecommunications network. In addition, the embodiments of the present invention have been described in the context of a GSM system which utilizes a time division multiple access (TDMA). It is clear that this invention is also applicable to any other access techniques including frequency division multiple access (FDMA) and code division multiple access (CDMA) as well as any hybrids thereof.

It is also noted herein that while the above describes exemplifying embodiments of the invention, there are several variations and modifications which may be made to the disclosed solution without departing from the scope of the present invention as defined in the appended claims.

The invention claimed is:

1. A method in a telecommunications system, the telecommunication system comprising at least a first telecommunication network and a second telecommunications network and providing at least one supplementary telecommunications service for a first station, the method comprising the steps of:
    initiating a set-up procedure for communications between the first station and a second station via said telecommunication system, wherein the first station initiates the communication with the second station;
    sending an enquiry to a number portability service, said number portability service facilitating porting of stations from the first telecommunications network to the second telecommunications network so that the number or address of the ported stations remains the same;
    determining if the second station is a ported station; and
    informing at least one supplementary telecommunications service of the results of said determination during a phase that is before a phase in which the set-up procedure is completed and before provision of said at least one supplementary telecommunication service for said first station is initiated.

2. A method according to claim 1, wherein the step of determining the status of the number portability service for the second station and the step of informing said at least one supplementary telecommunications service of said status are accomplished at a node controlling both the number portability service and said at least one supplementary telecommunications service.

3. A method in accordance with claim 2, wherein the supplementary telecommunications service is based on an INAP protocol suite, and the control node comprises a service control point (SCP) and a number portability register of the number portability service.

4. A method in accordance with claim 3, wherein the supplementary telecommunications service is based on customised applications for mobile network enhanced logic, and the control node comprises a service environment of the customised applications for mobile network enhanced logic and a number portability register of the number portability service.

5. A method in accordance with claim 1, wherein said at least one supplementary telecommunication service is informed of the results of the determination only if the second station is determined to be a ported station.

6. A method in accordance with claim 1, wherein the number portability service is one of the supplementary telecommunications services provided by the telecommunications system.

7. A method in accordance with claim 1, wherein the telecommunications system comprises a mobile telecommunications network including a controller and a home location register for storing user related data associated to individual subscribers of the mobile telecommunications network, and the number portability service comprises a routing information register between the network controller and the home location register, comprising the steps of:
   sending the enquiry as a routing information enquiry from the network controller to the home location register during the set-up of the connection;
   directing the routing information enquiry to pass through the routing information register;
   determining at the routing information register the status of the number portability service of the second station; and
   if the second station is determined to be a ported number, returning the status information to the controller without allowing the routing information enquiry to enter the home location register.

8. A method in accordance with claim 1, wherein the status of the number portability service is verified in the beginning of an originating status model of an supplementary telecommunications application protocol suite.

9. A method according to claim 8, wherein the verifying of said status comprises a step of sending a service routing register inquiry at an initial detection point of an INAP or a CAMEL protocol.

10. A network element for use in a telecommunications system, said telecommunications system comprising at least a first telecommunications network and a second telecommunications network and providing at least one supplementary telecommunications service for a first station communicating with the system, the network element comprising:
   communication set-up means for set-up proceedings of a communication between the first station and a second station, wherein the first station initiates the communication with the second station;
   control means for controlling said at least one supplementary telecommunications service;
   means for providing a number portability service for the stations, said number portability service facilitating porting of a station from the first telecommunications network so that the number or address of the ported station remains the same;
   wherein the network element is arranged to determine if the second station is a ported station and to inform said at least one supplementary telecommunications service of the result of the determination during a phase that is before a phase in which the set-up procedure is completed and before use of said at least one supplementary telecommunications service is initiated for the communication by the first station.

11. A network element in accordance with claim 10, wherein the determination whether the second station is a ported station or not is accomplished by the means for providing the number portability service.

12. A network element in accordance with claim 10, wherein the control mans for controlling said at least one supplementary telecommunications service comprises a service control point and the means for providing number portability service comprise a routing register.

13. A network element in accordance with claim 12, wherein the network element is arranged to use intelligent network application part (INAP) protocol suite for implementing the supplementary telecommunications services, and to verify the status of the number portability service for the second station in the beginning of originating status model of the intelligent network application part (INAP) protocol.

14. A network element in accordance with claim 10, wherein the network element is arranged to use customised applications for mobile network enhanced logic, the control means comprise a service environment of the customised applications for mobile network enhanced logic and the means for providing number portability service comprise a routing register.

15. A network element in accordance with claim 10, wherein the number portability service is one of the supplementary telecommunications services.

16. A network element in accordance with claim 10, wherein the telecommunications system comprises a first mobile network and a second mobile network, the second station being a mobile station ported from the first mobile network to the second mobile network.

17. A telecommunications system enabling at least two stations connected to the system to communicate comprising:
   a first telecommunications network;
   a second telecommunications network;
   supplementary telecommunications service means for providing at least one supplementary telecommunications service for a first station;
   control means for controlling said at least one supplementary telecommunications service;
   communication set-up means for set-up proceedings of a communication between the first station and a second station, wherein the first station initiates the communication with the second station;
   means for providing a number portability service for the stations, said number portability service facilitating porting of a station from the first telecommunications network to the second telecommunications network so that the number or address of the ported station may remain the same; wherein the telecommunications system is arranged to determine if the second station is a ported station and to inform said at least one supplementary telecommunications service of the result of the determination during a phase that is before a phase in which the set-up procedure is completed and before use of said at least one supplementary telecommunications service is initiated for the communication by the first station.

18. A telecommunications system in accordance with claim 17, wherein the determination whether the second station is a ported station or not is accomplished by the means for providing the number portability service.

19. A telecommunications system in accordance with claim 17, wherein the control means for controlling said at least one supplementary telecommunications service comprises a service control point and the means for providing number portability service comprise a routing register.

20. A telecommunications system in accordance with claim 17, wherein the number portability service is one of the supplementary telecommunications services provided by the telecommunications system.

21. A telecommunications system in accordance with claim 17, comprising a first mobile network and a second mobile network, the second station being a mobile station ported from the first mobile network to the second mobile network.

* * * * *

UNITED STATES PATENT AND TRADEMARK OFFICE
CERTIFICATE OF CORRECTION

PATENT NO. : 7,096,023 B1 Page 1 of 1
APPLICATION NO. : 10/019713
DATED : August 22, 2006
INVENTOR(S) : Jari Eikkula It is certified that error appears in the above-identified patent and that said Letters Patent is hereby corrected as shown below:

In column 11, line 62 (claim 12, line 2) "mans" should be --means--.

Signed and Sealed this

Seventeenth Day of April, 2007

JON W. DUDAS
*Director of the United States Patent and Trademark Office*